United States Patent [19]

Wahlström

[11] Patent Number: 4,673,862
[45] Date of Patent: Jun. 16, 1987

[54] METHOD OF RECHARGING A RECHARGEABLE BATTERY

[76] Inventor: Tommy Wahlström, Pl 4571, 434 00 Kungsbacka, Sweden

[21] Appl. No.: 637,230
[22] PCT Filed: Dec. 6, 1983
[86] PCT No.: PCT/SE83/00427
 § 371 Date: Jul. 19, 1984
 § 102(e) Date: Jul. 19, 1984
[87] PCT Pub. No.: WO84/02431
 PCT Pub. Date: Jun. 21, 1984

[30] Foreign Application Priority Data

Dec. 6, 1982 [SE] Sweden .............................. 8206946
Jul. 1, 1983 [SE] Sweden .............................. 8303775

[51] Int. Cl.$^4$ .............................................. H02J 7/14
[52] U.S. Cl. ........................................ 320/64; 320/48; 320/23; 322/28; 322/99
[58] Field of Search ...................... 322/28, 99; 320/64, 320/48, 20, 21, 22–24, 39

[56] References Cited

U.S. PATENT DOCUMENTS

| 3,617,851 | 11/1971 | DuPuy et al. | 320/22 |
| 3,890,556 | 6/1975 | Melling et al. | 320/21 |
| 3,936,718 | 2/1976 | Melling et al. | 320/20 |
| 3,938,019 | 2/1976 | Schmitt et al. | 320/21 |
| 4,061,956 | 12/1977 | Brown et al. | 320/21 X |
| 4,210,857 | 7/1980 | Korbell | 322/28 |
| 4,310,793 | 1/1982 | Sheldrak et al. | 320/64 X |
| 4,386,310 | 5/1983 | Sievers | 322/28 |
| 4,395,672 | 7/1983 | Gassaway | 320/21 X |
| 4,471,288 | 9/1984 | Morishita et al. | 322/99 |

FOREIGN PATENT DOCUMENTS 0034003 8/1981 European Pat. Off. .
2557010 6/1977 Fed. Rep. of Germany .
2402182 3/1980 Fed. Rep. of Germany .
2183257 12/1973 France .
2454209 11/1980 France .

Primary Examiner—R. J. Hickey
Attorney, Agent, or Firm—Hayes, Davis & Soloway

[57] ABSTRACT

This invention relates to a method for recharging a chargeable battery for a motor vehicle, a machine, a motor boat or the like. As the charging voltage there is used the output voltage from a charging generator which is connected to the battery, the output voltage being varied by controlling the field of the generator. The charging takes place by means of repeated charging cycles each of which consists of a charging period and a test period when the battery is loaded and the charging from the generator to the battery is disconnected. The value of the charging voltage during a charging period is determined on the basis of the test result during the immediately preceding test period. According to the invention the battery voltage is compared to a pre-determined voltage during each test period. If the comparison shows that the battery voltage is less than the pre-determined voltage or drops below this voltage during the test period, the charging of the battery during the following charging period takes place at a charging voltage which is sufficiently high that, by controlling the output voltage of the generator, there is rapid charging of the battery. If the comparison shows that the battery voltage is higher than the pre-determined voltage the charging during the following charging period takes place at a charging voltage which provides a compensating charging of the battery. During the later part of the charging period, just before the test period, the charging always takes place at a charging voltage corresponding to the compensating charge.

9 Claims, 7 Drawing Figures

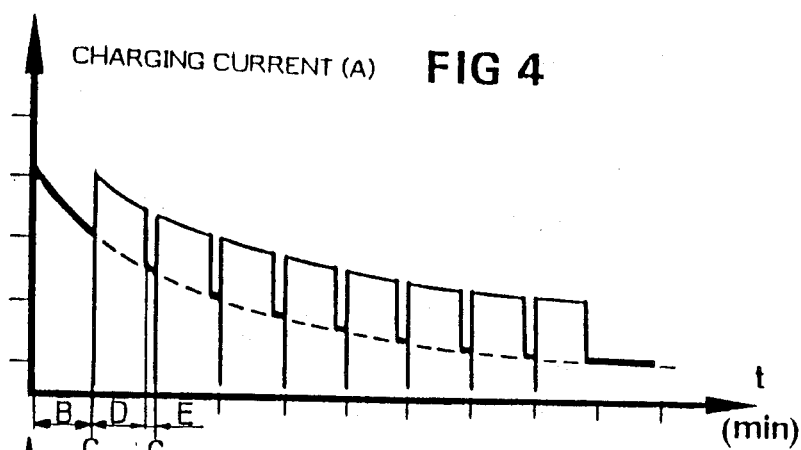
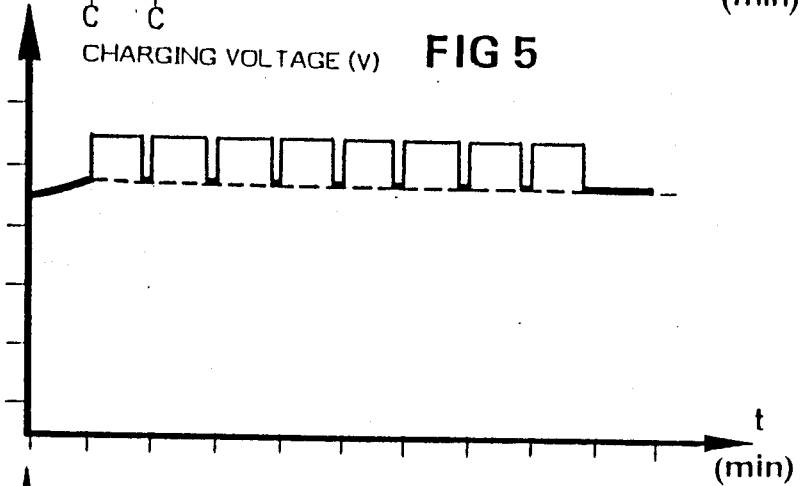
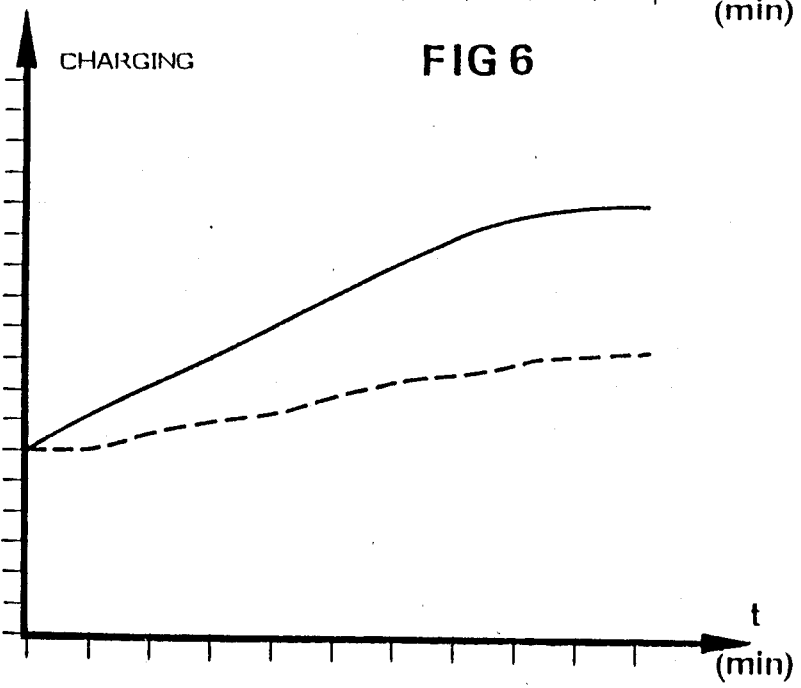

METHOD OF RECHARGING A RECHARGEABLE BATTERY

This invention relates to a method for recharging a chargeable battery for a vehicle, a machine, a motor boat or the like, whereby the output voltage from a battery charging generator connected to the battery is used as a charging voltage the magnitude of which can be varied by controlling the field of the generator and whereby the recharging is performed by means of repeated charging cycles each of which consists of a charging period and a test period during which the battery is loaded and the charging from the generator to the battery is disconnected. The magnitude of the charging voltage during a charging period is determined with regard to the test result achieved during the immediately preceding test period. The invention also relates to a charging regulator for recharging of a rechargeable battery for a motor vehicle, a machine, a motor boat or the like, said regulator being connected to a line between the battery and a battery recharging generator of a type in which the output voltage thereof can be varied by varying the magnetizing current of the generator. During repeated charging cycles each of which consists of a test period and a charging period, the regulator interrupts the charging during each test period while the battery is loaded in order to measure the charging condition of the battery and to control the output voltage of the generator during the next following charging period, depending on the detected charging condition.

In recent years battery run electrical equipment such as, for example, refrigerators, heaters and radio equipment has become more and more common in, for example, long distance trucks and motor boats. As such equipment consumes a substantial current compared with the equipment that was previously conventional, the new equipment produces a bigger load on the battery, especially as the generator and its regulator are designed to provide current only when the engine that drives the generator, as well as the vehicle or boat, is running. If the engine has not been running for a couple of hours while one or more of the above items of equipment has been connected, the battery is normally more or less discharged.

In accordance with one aspect of the present invention there is provided a method for recharging during operation a chargeable battery connected to an electrical system of a motor vehicle, a machine, a motor boat or the like wherein the output voltage from a generator connected to the battery is used as a charging voltage the amplitude of which can be varied by controlling the field of the generator, and wherein the recharging is performed by one or repeated charging cycles during which the charging is performed at a raised charging voltage which, by controlling the output voltage of the generator, is just below the upper limit of the range of operating voltage of the electrical system.

In accordance with a further aspect of the present invention there is provided a voltage regulator for recharging during operation a rechargeable battery which is connected to an electrical system of a motor vehicle, a machine, a motor boat or the like, said regulator being connected to a line between the battery and a generator having an output which can be varied by varying the magnetizing current of the generator, wherein the regulator comprises a control device arranged to define cyclic charging periods of equal time during which, by controlling the magnetizing current of the generator, there is applied to the battery an increased voltage which is just below the upper limit voltage value of the electrical system.

Other features and characteristics of the present invention will be obvious from the following specification in conjunction with the enclosed drawings in which:

FIG. 1 is a block diagram showing a conventional charging regulator system;

FIG. 2 which corresponds to FIG. 1 illustrates a charging regulator system according to the present invention;

FIGS. 4–6 show by a dotted and a continuous line, respectively, how charging current, charging voltage and charging quantity varies with time when using a conventional charging voltage regulator and a regulator according to the invention, respectively.

Figure 1:
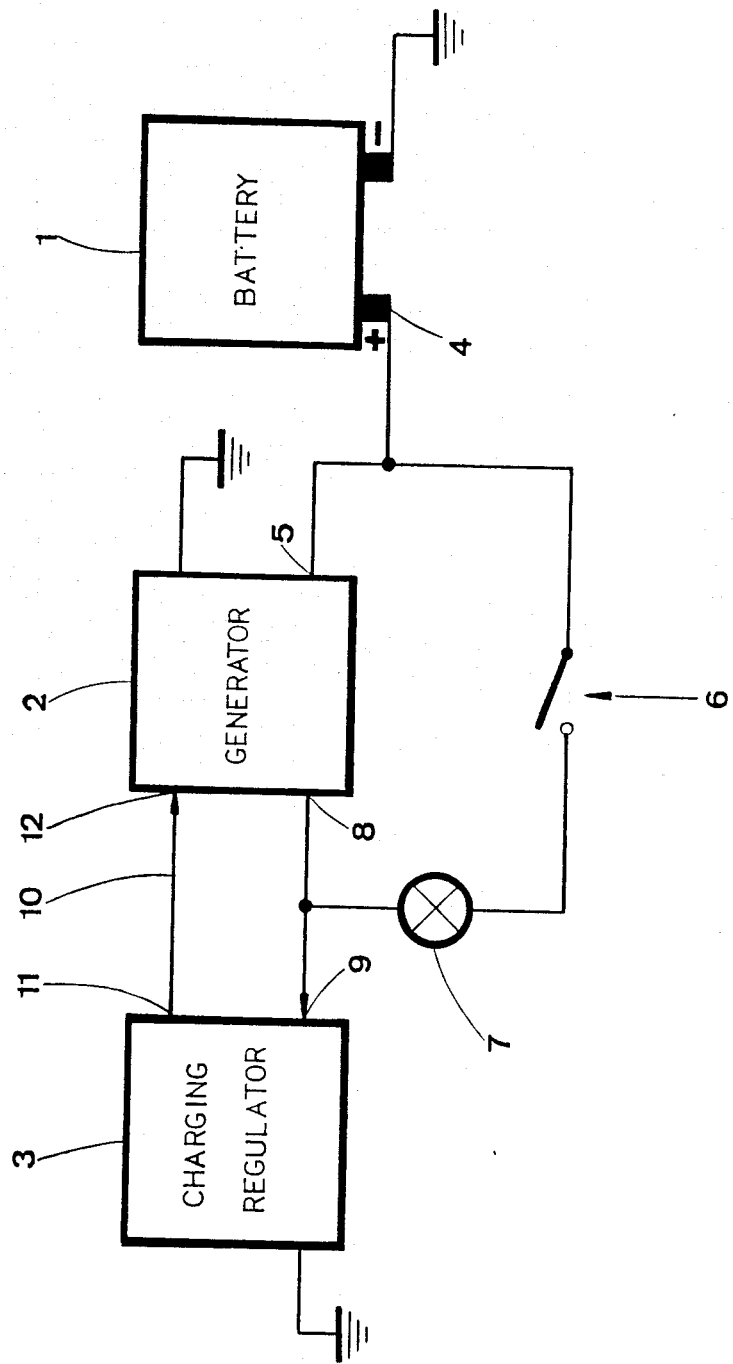

FIG. 1 shows schematically in the form of a block diagram how a battery 1, a generator 2 and a charging regulator 3 are internally electrically connected in a conventional charging regulator system having a negative earth to be used, for example, in a motor vehicle. The positive pole 4 of the battery 1 is connected to the charging output 5 of the generator 2 and is also connected, via an ignition key switch 6, to one terminal of a charging light 7, the other terminal of which is connected to the regulator voltage output 8 of the generator 2. This other terminal of the light 7 is also connected to the supply- and measuring input 9 of the regulator 3. A line 10 connects the regulator output 11 of the regulator 3 with the field winding input 12 of the generator 2.

When the ignition key switch 6 is closed as the engine is started, the battery is connected to the regulator 3 and hence to the field winding of the generator 2. Before the charging commences, current flows from the battery 1 to the regulator 3. This current passes through the charging lamp 7, which is thus lit. When the generator 2 is recharging the battery 1, the voltage of the output 8 is equal to the battery voltage. At this time there is no current flow through the charging light 7, which consequently is not lit. The regulator 3 operates in such a manner that by detecting the voltage at the output 8 it controls the generator field so that the output voltage of the generator 2, i.e. its charging voltage, has a predetermined value. When the input voltage of the regulator is less than this voltage value, the battery is completely recharged. The charging ceases when the input voltage reaches said value.

It will be appreciated that recharging of the battery 1 with the above-described conventional charging regulator system is not achieved in the expected manner if the generator runs at a low speed, if the connections between the generator 2 and the battery 1 are in poor condition, or if the charging ability of the battery 1 is reduced. At low speed of the generator 2 no more charging is achieved than that which is needed for the charging light 7 to go off, and one is misled into believing that the charging is working perfectly when in reality perhaps only a few amperehours have been added to the battery 1 although the engine has been working for a considerable time. It is very common for the conductors, the connections between the conductors and the poles of the battery 1 and battery master switch to be in poor condition which causes a potential drop. Since the regulator 3 detects the voltage at the generator 2, and not at the battery, the charging voltage may be as much as 1 V less than the predetermined charging voltage at low charging amperages. This causes minimal or no charging of the battery 1. The conventional regulator 3 also controls the output voltage of the generator 2 so that this has a constant value which is independent of the charging ability of the battery. This also results in the effective charging being very poor with an extremely discharged battery.

The object of the present invention is to provide a method of, and a charging regulator for, recharging a rechargeable battery in which the method and regulator do not have above disadvantages. This object is achieved by the invention having the characteristics recited in the appended claims.

Figure 2:
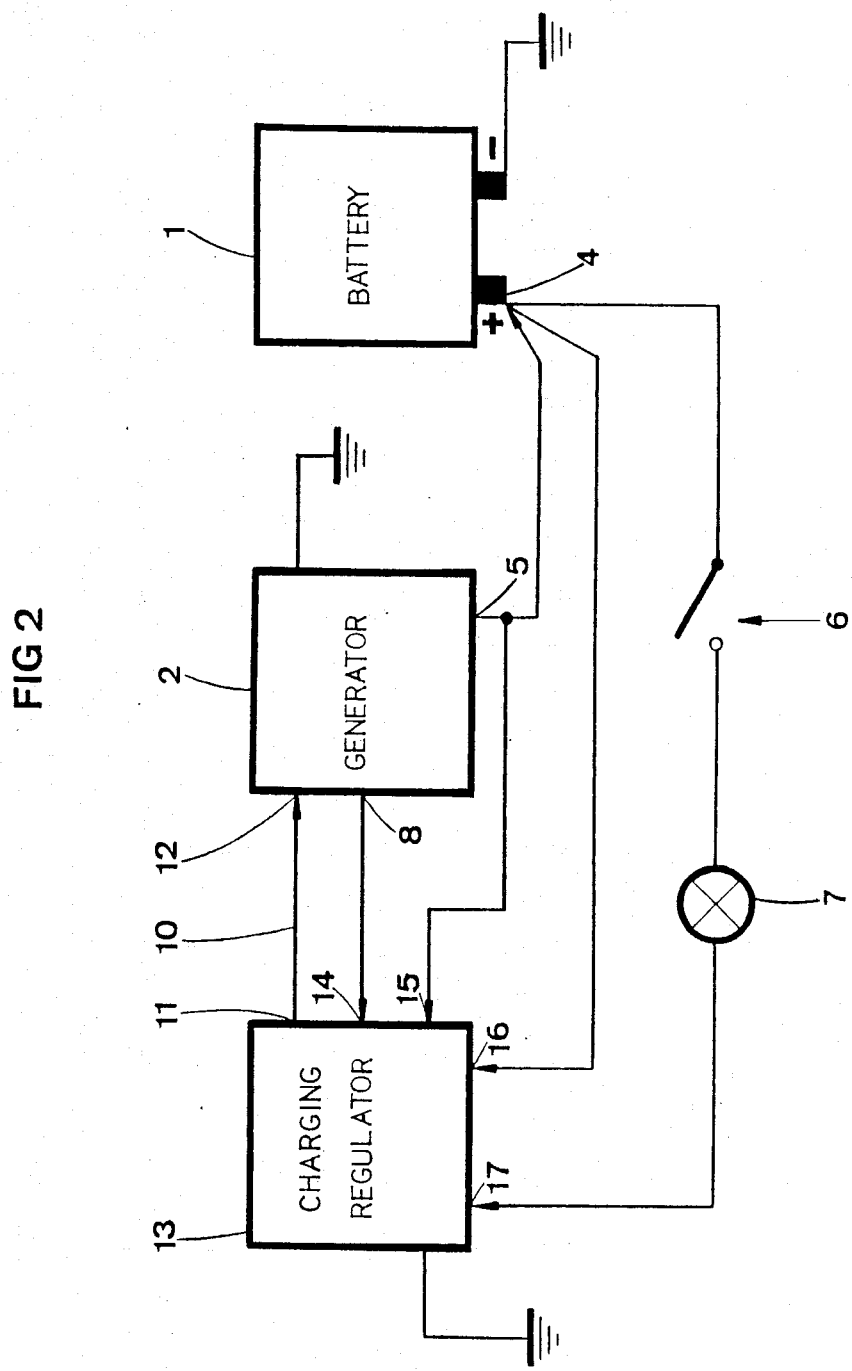

In FIG. 2 in which the same reference numbers as in FIG. 1 are used where applicable, 13 denotes a charging regulator according to the present invention. Apart from the output 11, which is identical to that of the regulator 3, the regulator 13 has four inputs 14, 15, 16 and 17. The input 14 is connected to the regulator voltage output 8 of the generator and is arranged to receive a starting signal from the generator 2 showing that the generator is working and is generating a charging voltage. The input 15 which is connected to the charging output 5 of the generator and to the positive pole 4 of the battery 1 can be compared with the input 9 of the regulator 3 which is a feed- and test signal input. The input 16 is directly connected to the positive pole 4 of the battery 1 and is therefore the test signal input for the battery voltage, and the input 17 which is connected to the positive pole 4 of the battery 1 via the ignition key switch 6 and the charging light 7 can also be considered as a starting signal input the function of which can likewise be compared to that of the input 9 of the regulator 3.

The regulator 13 according to the invention differs from the conventional regulator 3 in the following respects: By way of the charging light 7 or any other acoustic or optic alarm means, a warning is provided when the generator 2 does not reach its working voltage as a result of operating at too low a speed. It also provides a warning if the potential drop between the generator 2 and the battery 1 is unacceptably high. The charging voltage and therefore also the charging current to the battery 1 is regulated with respect to the condition of the battery. The charging is carried out by means of repeated charging cycles each of which consists of a charging period, and a test period with the battery loaded. The charging voltage is determined on the basis of the test result. An extremely discharged battery cannot assimilate maximum charging for an unlimited time, which is why there is also a time limit in order to protect the battery against this type of overcharging.

Figure 3:
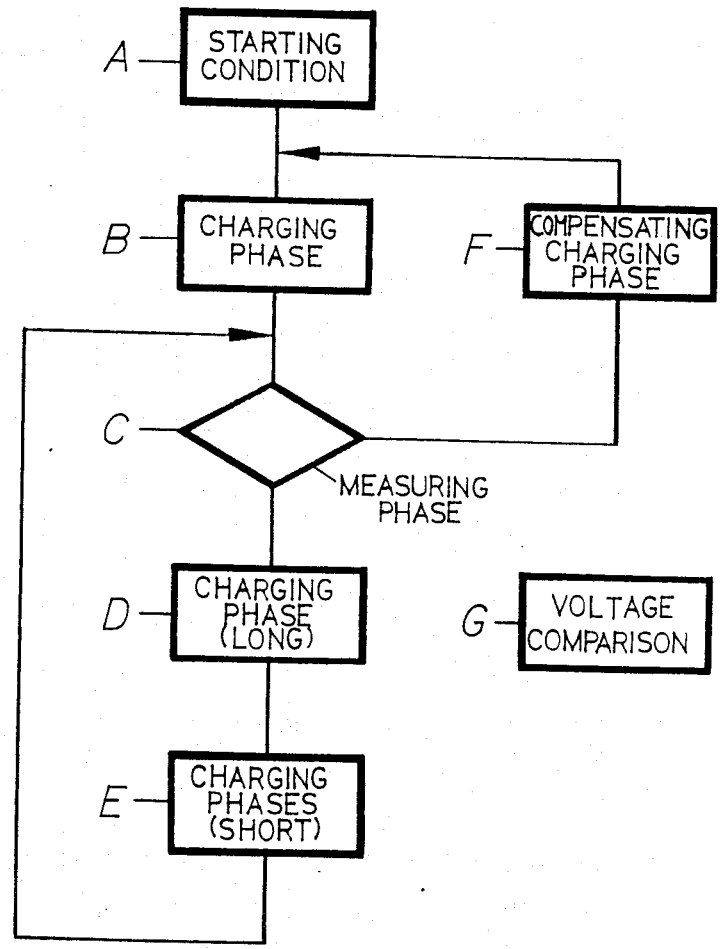
FIG. 3 is a flow chart which shows how a charging regulator according to the invention functions.

It will now be explained in more detail how charging according to the invention takes place with reference to the flow chart in FIG. 3. A refers to the starting condition. The regulator commences to be fed with current, via the input 15 and the charging programme is set at zero. Stage B represents a charging period during which a charging voltage which provides a compensating charge to the battery is applied to the battery for a certain period of time (5 minutes). If a 12 V battery is used (which will be assumed to be the case in the following description) typical value for a compensating charge voltage is 14 V and the period of time is 5 minutes. To achieve this, the battery voltage is compared to a reference voltage and the regulator controls the field current of the generator so that said voltages are equalised. To check the condition of the lead between the generator and the battery, the battery voltage is compared to another reference voltage (9 V), which is considerably smaller than the first said reference voltage. If the battery voltage happens to be lower than the second reference voltage the voltage detection of the regulator 13 is changed from the battery pole 4 to the charging output 5 of the generator 2. After the above mentioned time (5 minutes) has lapsed the regulator programme switches over to C.

Stage C is a measuring phase. The battery voltage is measured for a certain period of time (1 minute) but is cut off if the battery voltage drops below a certain voltage (13.2 V) before the time is ended. While measuring, all alarms are blocked, and the charging of the battery is cut off by cutting the field current of the generator 2. It is presumed that the battery is loaded while measuring. This is automatically the case with cars where the head lights or other equipment of the type hereinbefore referred to is switched on. The measuring of the battery voltage takes place by comparing it to the said reference voltage. If the battery voltage is equal to or less than the reference voltage, the programme continues to D. If the battery voltage is higher than the reference voltage the programme continues to F. At D the battery is charged with a charging voltage (14.6 V) for a certain period of time (8 minutes) which is equal to quick charging of the battery. The said time, however, is counted from the moment the voltage exceeds a certain value (14.4 V), whereby a charging time which takes into consideration the capacity of the battery is achieved. In other words D comprises the charging phase which also applies to E.

During stage E charging takes place with a voltage (14 V) related to the compensating charge for a time (2 minutes) which is shorter than the time of stage D. Thereafter the charging programme switches to C.

If the battery voltage is higher than the first reference voltage the charging programme of the regulator switches to F.

Stage F is a compensating charging phase which takes place for a comparatively long time (1-3 hrs). After this the programme switches to B.

It can be observed that the sequence consisting of C, D and E provides quick charging of the battery, while the sequence including C, F and B provides a compensating charging of the battery.

Stage G represents the different test measurements or comparisons which are carried out according to the invention and which have previously been partly explained. In this stage the battery voltage and the generator voltage are continuously compared to the reference voltages to determine overvoltage, undervoltage or unacceptable potential drops in the lead between the generator and the battery.

In FIG. 4 the programme stages A, B, C, D and E are again shown. In relation to charging current as well as charging voltage and amount of charging, the graphs (continuous) showing charging according to the invention are all above those (dotted) which represent a conventional system of charging.

Although it is obvious that a man skilled in the art, having knowledge of how a charging regulator according to the invention functions, can make this invention in a number of ways, one example of the invention will be explained in the following, referring to the block diagram shown in FIG. 7. While for simplicity the invention is described with reference to FIG. 7 in a rather general manner, in practice the whole regulator is preferably constructed on one so-called IC circuit with which further test and control functions outside the scope of the present invention can be achieved, if so desired.

Figure 7:
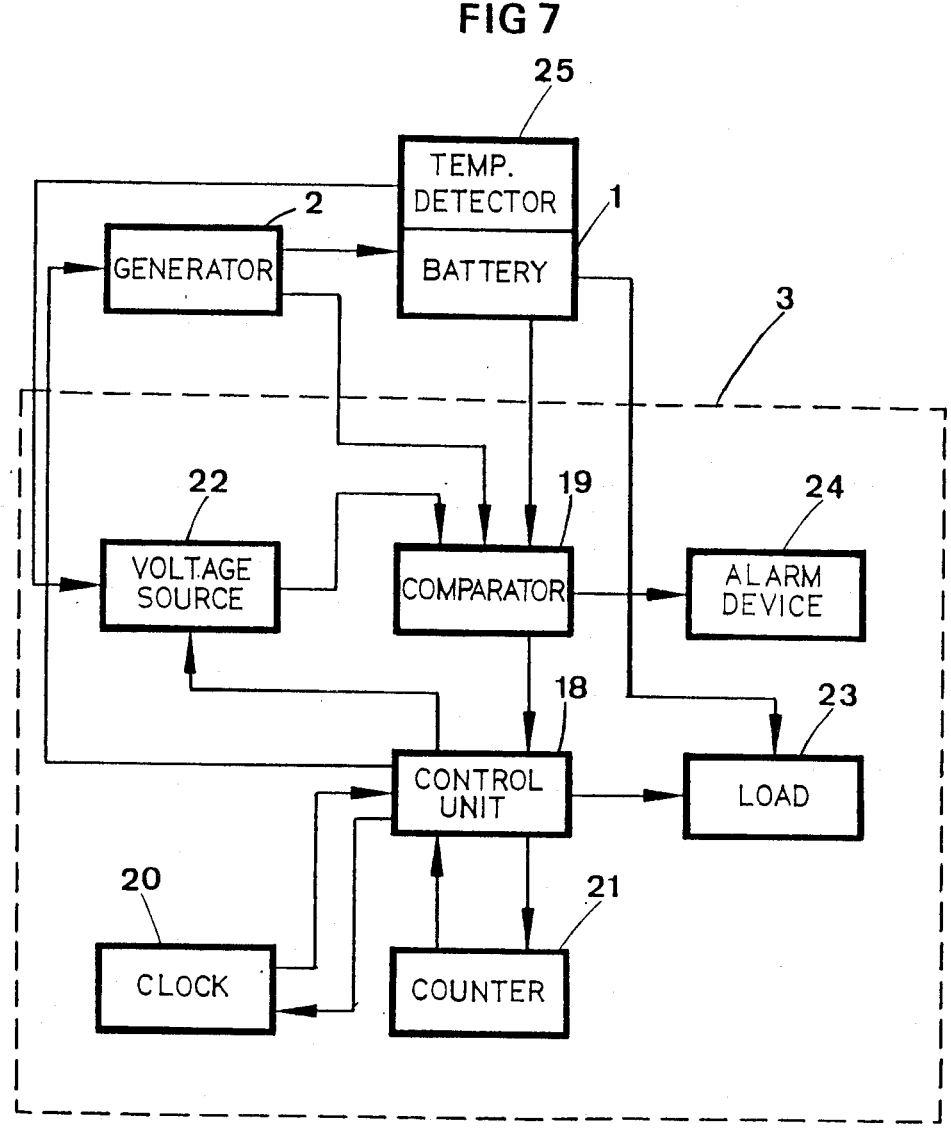
FIG. 7 is a block diagram showing the principal design of a charging regulator according to the invention.

In FIG. 7 the battery 1, the generator 2 and, within a dotted outline, the regulator 3 are again shown. Numeral 18 denotes a control unit the inputs of which are connected to a comparator 19, a clock 20 consisting of an oscillator, and a binary counter, arranged to generate control pulses to control all time lapses in the control unit 18, and a counter 21. The outputs of the control unit 18 are connected to a reference voltage source 22 arranged to generate the previously described said reference voltages, to the generator 2, to the clock 20, to the counter 21 and to the load 23. The inputs of the comparator are connected to the reference voltage source 22, the generator 2 and the battery 1. Apart from said connection to one of the inputs of the control unit the output of the comparator 19 is connected to an alarm device 24 arranged to provide an optic and/or acoustic alarm.

A temperature detector 25 thermally connected to the battery 1 is arranged to generate a signal related to the temperature of the battery and to control the reference voltage source 22 with this signal, so that all reference voltages and thereby also the battery charging voltage are increased with a decreasing battery temperature. The opposite takes place with an increasing battery temperature.

The comparator 19 includes a number of comparing circuits arranged to compare the reference voltages from the reference voltage source 22 with the generator- and battery voltages as described previously. As a result of these comparisons control signals are generated to the control unit 18 and alarm signals are generated to the alarm device 24. This is arranged to provide warnings with different characteristics for different errors so that these can be easily identified.

The control unit 18 is arranged to control the generator voltage, in the manner that is characteristic of the invention, governed by inputs from the comparator 19, the clock 20 and the counter 21. If the battery 1 is not sufficiently loaded during the measuring phase, which is often the case with diesel engine driven motor boats, the load 23 is automatically switched on. The number of charging cycles when charging takes place at a voltage related to quick charging is counted by the counter 21, which is arranged to provide a switch off signal to the control unit when a pre-decided number of quick charging cycles (e.g. 8) has taken place.

I claim:

1. Method for recharging during operation of a chargeable battery (1) connected to an electrical system of a motor vehicle, a working machine, a motor boat or similar, whereby an output voltage from a generator (2) connected to the battery (1), by way of a charging circuit, is used as a charging voltage the amplitude of which can be varied by means of controlling the field of the generator (2), characterized in that, the recharging is performed by means of at least one charging cycle during which charging is performed at a voltage level suitable for recharging the battery which is controlled by the output voltage of the generator (2), each charging cycle consists of a charging period and a test period, and during the test period the battery (1) is loaded and the charging circuit from the generator (2) to the battery (1) is disconnected.

2. Method for recharging during operation of a chargeable battery (1) connected to an electrical system of a motor vehicle, a working machine, a motor boat or similar, whereby an output voltage from a generator (2) connected to the battery (1), by way of a charging circuit, is used as a charging voltage the amplitude of which can be varied by means of controlling the field of the generator (2), characterized in that, the recharging is performed by means of at least one charging cycle during which charging is performed at a voltage level suitable for recharging the battery which is controlled by the output voltage of the generator (2), each charging cycle consists of a charging period and a test period, during the test period the battery (1) is loaded and the charging circuit from the generator (2) to the battery (1) is disconnected, and the battery voltage is compared to a pre-decided voltage, if the comparison shows that the battery voltage is lower than the pre-decided voltage, or decreases to below this voltage during the test period, recharging takes place during the following charging period at a suitable charging voltage and if the comparison shows that the battery voltage is higher than the pre-decided voltage, the recharging during the following charging period takes place at a charging voltage which gives a compensating charge to the battery (1), and that during the later part of the charging period, immediately before the test period, the charging always takes place at a charging voltage corresponding to the compensating charge.

3. Method for recharging during operation of a chargeable battery (1) connected to an electrical system of a motor vehicle, a working machine, a motor boat or similar, whereby an output voltage from a generator (2) connected to the battery (1) is used as a charging voltage the amplitude of which can be varied by means of controlling the field of the generator (2), characterized in that, the recharging is performed by means of at least one charging cycle during which charging is performed at a voltage level suitable for recharging the battery which is controlled by the output voltage of the generator (2), wherein recharging with a rapid charging voltage is carried out during at most a pre-decided number of charging periods and the recharging which takes place thereafter is at a compensating charge voltage.

4. Method for recharging during operation of a chargeable battery (1) connected to an electrical system of a motor vehicle, a working machine, a motor boat or similar, whereby an output voltage from a generator (2) connected to the battery (1) is used as a charging voltage the amplitude of which can be varied by means of controlling the field of the generator (2), characterized in that, the recharging is performed by means of at least one charging cycle during which charging is performed at a voltage level suitable for recharging the battery which is controlled by the output voltage of the generator (2), during charging at a suitable charging voltage, each charging cycle duration is counted in effective charging time, that is, the period duration is counted only under a presumption that the charging voltage exceeds a certain value.

5. Voltage regulator for recharging during operation of a rechargeable battery (1), connected to an electrical system of a motor vehicle, a working machine, a motor boat or similar, a regulator (3) being connected to a line between the battery (1) and a generator (2) of a kind an output of which can be varied by varying a magnetizing current of the generator (2), characterized in that the regulator (3) comprises a control device (18) arranged to define cyclic charging periods of equal time and to control the magnetizing current of the generator (2) applied to the battery (1) and to maintain a charging voltage to just below an upper limit voltage value of the electrical system, the control device (18) is arranged to insert test periods between the charging periods, during the test periods the magnetizing current of the generator (2) is momentarily interrupted while the battery (1) is partially loaded.

6. Voltage regulator for recharging during operation of a rechargeable battery (1), connected to an electrical system of a motor vehicle, a working machine, a motor boat or similar, a regulator (3) being connected to a line between the battery (1) and a generator (2) of a kind an output of which can be varied by varying a magnetizing current of the generator (2), characterized in that the regulator (3) comprises a control device (18) arranged to define cyclic charging periods of equal time and to control the magnetizing current of the generator (2) applied to the battery (1) and to maintain a charging voltage to just below an upper limit voltage value of the electrical system, a comparator (19) is arranged with a loaded battery (1) and the control device (18), the comparator (19) is connected with the battery (1) and a reference voltage source (22), the comparator (19) compares the battery voltage with a pre-decided voltage value, during the following charging period a charging voltage which is big enough to be a compensating charge is applied to the battery (1) if the battery voltage has been found to be higher than the pre-decided voltage value, otherwise an increased voltage is applied to the battery (1) under a presumption that the comparator (19), during a test period, has found that the battery voltage is lower than said pre-decided voltage value.

7. Voltage regulator for recharging during operation of a rechargeable battery (1), connected to an electrical system of a motor vehicle, a working machine, a motor boat or similar, a regulator (3) being connected to a line between the battery (1) and a generator (2) of a kind an output of which can be varied by varying a magnetizing current of the generator (2), characterized in that the regulator (3) comprises a control device (18) arranged to define cyclic charging periods of equal time and to control the magnetizing current of the generator (2) applied to the battery (1) and to maintain a charging voltage to just below an upper limit voltage value of the electrical system, the regulator (3) includes a temperature detector (25) arranged on the battery (1) and a reference voltage source (22) is arranged to stepwise vary the reference voltage value depending on an output from the temperature detector (25), increasing the voltage value in proportion to a decreasing battery temperature and decreasing the voltage value in proportion to an increasing temperature.

8. Voltage regulator for recharging during operation of a rechargeable battery (1), connected to an electrical system of a motor vehicle, a working machine, a motor boat or similar, a regulator (3) being connected to a line between the battery (1) and a generator (2) of a kind an output of which can be varied by varying a magnetizing current of the generator (2), characterized in that the regulator (3) comprises a control device (18) arranged to define cyclic charging periods of equal time and to control the magnetizing current of the generator (2) applied to the battery (1) and to maintain a charging voltage to just below an upper limit voltage value of the electrical system, the regulator (3) includes a counting device (21), arranged to count the number of consecutive charging periods where charging takes place at a charging voltage relating to a rapid charging and to control the charging regulator (3) to add a compensating recharging voltage to the battery (1) for a comparatively long time when said number exceeds a pre-decided number of charging periods.

9. Method for recharging during operation of a chargeable battery (1) connected to an electrical system of a motor vehicle, a working machine, a motor boat or similar, whereby the output voltage from a generator (2) connected to the battery (1), by way of a charging circuit, is used as a charging voltage the amplitude of which can be varied by means of controlling the field of the generator (2), characterized in that the recharging is performed by means of at least one charging cycle during which the charging is performed at a voltage level suitable for recharging the battery by controlling the output voltage of the generator (2); each charging cycle consists of a charging period and a test period during the test period the battery (1) is loaded and the charging circuit from the generator (2) to the battery (1) is disconnected; during the test period the value of the battery voltage is compared to a pre-decided voltage, that if the comparison shows that the battery voltage is lower than the pre-decided voltage, or decreases to below this voltage during the test period, the recharging takes place during the following charging period at a suitable charging voltage; and if the comparison shows that the battery voltage is higher than the pre-decided voltage, the recharging during the following charging period takes place at a charging voltage which gives a compensating charge of the battery (1) and that during the later part of the charging period, immediately before the test period, the charging always takes place at a charging voltage corresponding to the compensating charge.

* * * * *